H. G. MILLER.
SLICING MACHINE.
APPLICATION FILED JULY 7, 1917.
1,270,041.
Patented June 18, 1918.
2 SHEETS—SHEET 1.
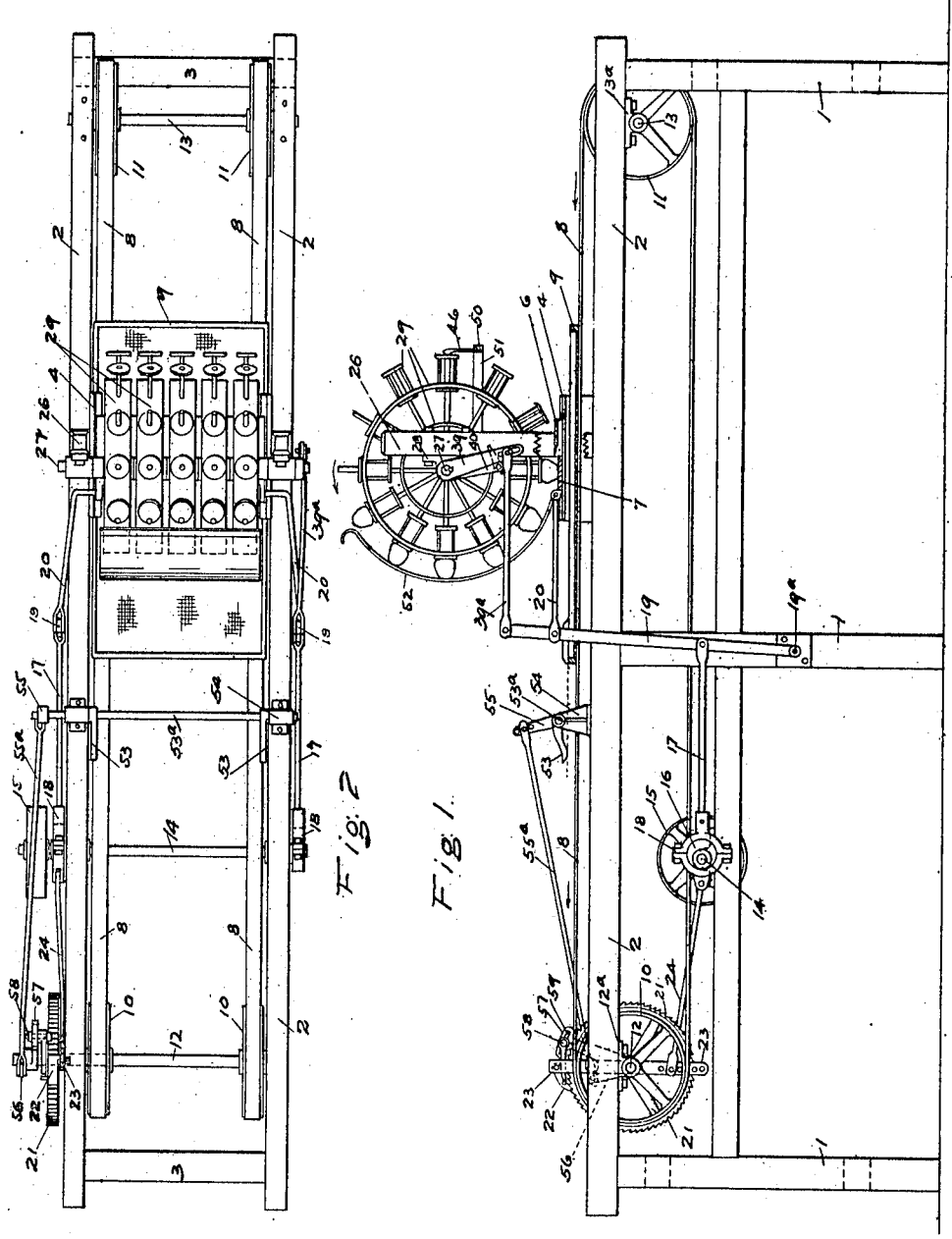

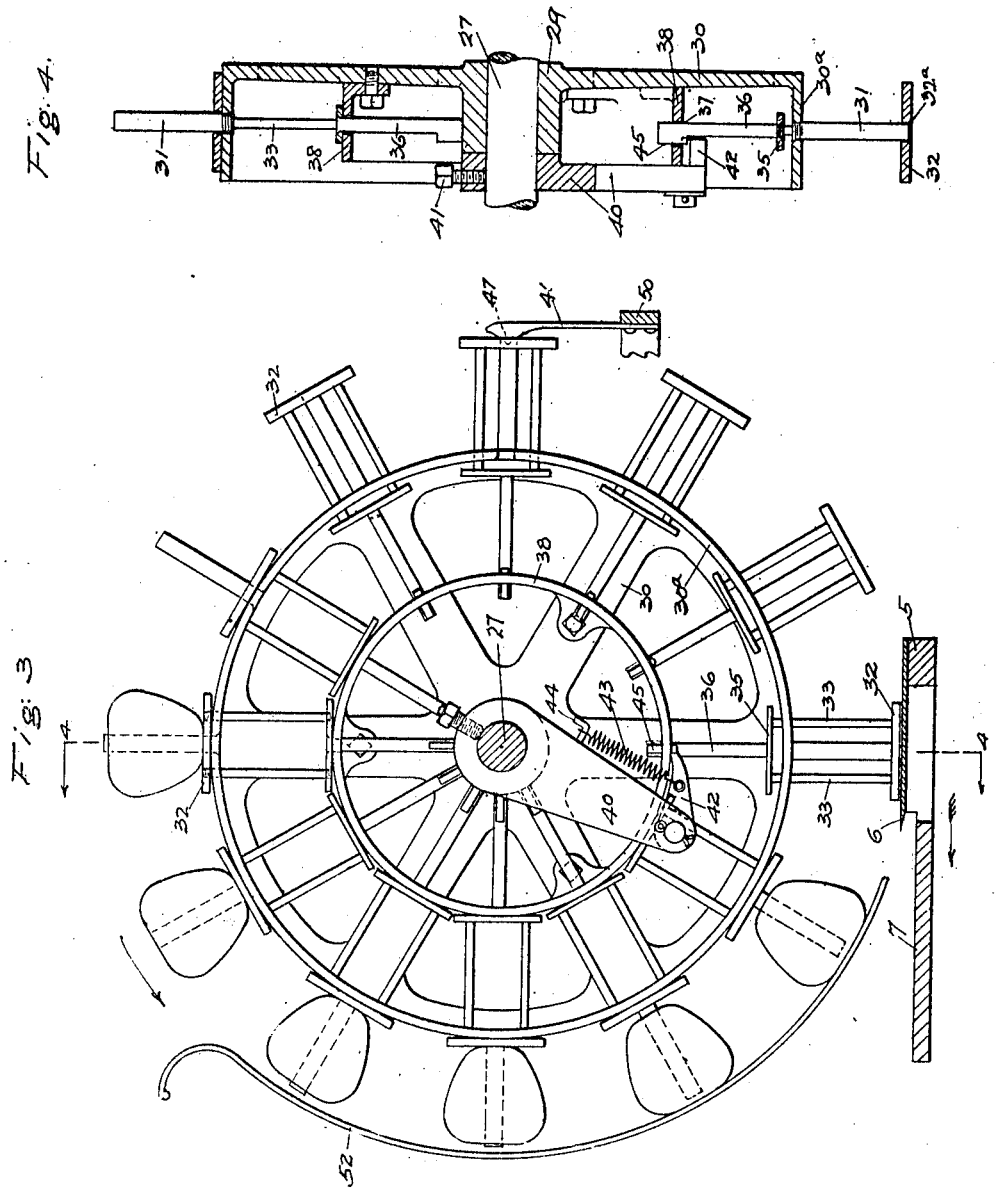

UNITED STATES PATENT OFFICE.

HERBERT G. MILLER, OF THE DALLES, OREGON, ASSIGNOR TO PACIFIC EVAPORATOR COMPANY, OF PORTLAND, OREGON, A CORPORATION OF OREGON.

SLICING-MACHINE.

1,270,041.　　　　Specification of Letters Patent.　　Patented June 18, 1918.

Application filed July 7, 1917. Serial No. 179,112.

*To all whom it may concern:*

Be it known that I, HERBERT G. MILLER, a citizen of the United States, residing at The Dalles, in the county of Wasco and State of Oregon, have invented new and useful Improvements in Slicing-Machines, of which the following is a specification.

This invention relates to slicing machines, and consists in certain improvements in the construction thereof as will be hereafter more fully described and pointed out in the claims.

The invention was particularly designed for slicing fruit and depositing same on trays preparatory to treatment and drying but may be used for other purposes, if desirable.

The invention as illustrated in the accompanying drawings is as follows:

Figure 1 shows a side elevation of the machine.

Fig. 2 shows a plan view of the machine.

Fig. 3 shows a side elevation of one of the fruit carriers.

Fig. 4 shows a section on the line 4—4 in Fig. 3.

The frame is made up of the legs or supports 1, the side pieces 2 and cross pieces 3. The guides 4 are arranged in the sides 2 and the cutter bar 5 is arranged to reciprocate on the guides 4, the blade 6 being positioned just above the fruit support 7, so as to give the proper thickness to the slices. A tray conveyer 8 carries the trays 9 in position to receive the slices as they are formed by the knife 6. The conveyer or tray carrier is driven by the pulleys 10 and runs over pulleys 11 at the opposite end of the machine. The pulleys 10 are mounted on shaft 12 and the pulleys 11 on the shaft 13, these shafts being mounted in bearings 12$^a$ and 13$^a$ respectively.

Drive shaft 14 is mounted on bearings in the side frame and a drive pulley 15 on the shaft 14 forms the driving means for the machine.

An eccentric 16 is mounted on the drive shaft 14 and an eccentric rod 17 extends from the eccentric strap 18 on the eccentric 16 to the lever 19. There are two eccentrics 16, one at each side of the machine, and two levers 19, one at each side of the machine. The levers 19 are pivotally mounted at 19$^a$ on supports 1 of the frame, and extend upwardly above the top of the frame. A link 20 extends from the lever 19 to the knife frame 9 so that the knife 6 and support 7 are reciprocated from the lever 19.

The tray carrier is advanced intermittently in proper relation to the action of the knife by a ratchet mechanism driven from one of the eccentrics 16. A ratchet wheel 21 is fixed on the shaft 12. A pawl 22 is carried by a rock arm 23. A link 24 extends from the rock arm 23 to the eccentric strap 18 so that the rock arm is reciprocated by the eccentric. It will be noted that as the eccentric moves the knife to form a cut the pawl is on its return movement, so that the material is deposited on the tray while the tray is stationary.

Posts 26 extend upwardly from the frame. A shaft 27 extends across the frame and is mounted in bearings 28 on the post 26. A series of fruit carriers 29 are journaled on shaft 27. Each of these carriers has the webs 30 from which the flanges 30$^a$ extend. Radial pins 31 extend from the flanges 30$^a$ and are arranged to receive fruit, as, for instance, a cored apple. A follower is slidingly mounted relatively to each of the pins 31. The follower comprises a plate 32, which has a perforation 32$^a$, through which the pin 31 extends. A pin 33 extends inwardly from each plate 32 through the flange 30$^a$ to a crosshead 35. Pins 36 extend inwardly from the crossheads 35 through openings 37 in a flange 38. A rock arm 39 is fixed on the end of the shaft 27 and is connected by means of link 39$^a$ with a lever 19 so that the rock arm 39 is given an oscillatory movement synchronized with the reciprocation of the knife.

A series of rock arms 40 are fixed on the shaft 27 by means of set screws 41, there being one rock arm 40 for each carrier 29. The rock arms 40 carry the pawls 42. The pawls are held in engagement with the flange 38 by springs 43, which extend from the pawls to hooks 44 on rock arms 40. Each pin 36 has a projection or lug 45, which when the pin is in its extreme upward position is carried through the perforation 37 in the flange 38 into the path of a pawl 42. In order to retain the carriers in the adjusted position when they are advanced yielding pawls 46 are provided, these pawls having the projections 47 which pass into small detents in the ends of the radial pins 31. The pawls 46 are in the form of springs which are carried by the cross piece 50 extending from arms 51 on the post 26. A guard or holder 52, formed preferably of a piece of sheet metal, extends around the carrier from near the top to just above the position of the knife so as to hold fruit which has been placed on the pins 31 from a movement outwardly on said pins before the fruit is presented to the knife.

The operation of this part of the machine is as follows:

The shaft 27 with the series of arms 40 and pawls 42 oscillates with each action of the knife. The fruit is carried from the upper position to an inverted position on the pin 30 and is held so that the knife makes a cut at right angles to the axis of the core or opening through the fruit. After the fruit is presented to the knife the slicing on this particular piece of fruit continues, the fruit descending on the pin 31 and the follower descending as the fruit descends. With the follower in the upper position the pawl 42 simply reciprocates back and forth on the flange 38, but does not affect any action of the carrier. When, however, the fruit has been entirely sliced and the follower reaches the lowest position the lug 45 is carried through the perforation 37 into the path of the pawl 42, and with the next movement of the arm and pawl the lug 45 is engaged and the carrier is advanced, bringing a new pin 31 into position over the knife.

It will be noted that this forward movement of the carrier takes place with the return movement of the knife so that a new piece of fruit is brought in position for action of the knife without skipping a cut, so that the trays are entirely filled.

It is desirable to have the fruit spaced on the trays so as to prevent the deposits of fruit on the ends of the trays. To accomplish this a slightly greater movement of the trays is necessary when one tray is filled and with the starting of the succeeding tray. The mechanism for this purpose is as follows:

A cam finger 53 is arranged in the path of the ends of the trays and is spaced from the fruit being cut just the length of one tray, so that when the end of a tray reaches the position under the fruit being cut the cam finger 53 is in position to be actuated by the opposite end of this tray. The fingers 53—there being one in each side of the machine—are carried by the rod 53ª. The rod 53ª is journaled in bearings 54 on the side frame and rock arm 55 is secured to the outer end of the rod 53ª. A link 55ª extends from the rock arm 55 to a rock arm 56 mounted on the shaft 12. A pawl carrier 57 is secured to the rock arm 56. This pawl carrier is such as to lift the pawl from engagement with the ratchet wheel 21 through a portion of its travel. When, however, the finger 53 is lifted by the end of the tray the pawl carrier is moved so as to permit the pawl to engage the ratchet wheel 21 through a greater part of its travel, and in consequence the advance of the tray carrier under these conditions is greater than normal and is sufficient to transfer the point of deposit of the fruit as sliced from one tray to another, thus preventing deposit of fruit on the ends of the trays.

It may be desirable to vary the amount of travel of the tray carrier with each operation of the ratchet mechanism, as, for instance, where different sizes of fruit are sliced. To accomplish this the pawl carrier 57 is adjustably secured by means of a bolt 58 on the rock arm 56, the rock arm having a slot 59 in which the bolt may be moved to adjust the carrier to any position desired, so that a greater or lesser part of the travel of the pawl is in engagement with the ratchet wheel.

In the general operation of the machines all that is necessary for the operator is to supply fruit to the fruit carriers as they are brought to their upper position and to place the empty trays on the carriers so as to keep the tray carriers full, and to remove the filled trays from the carrier. The different operations further than this are accomplished automatically.

What I claim as new is:

1. In a slicing machine the combination of a knife; a carrier in which a piece to be sliced is placed; and means controlled by the material being sliced for advancing the carrier upon the completion of the slicing of the piece.

2. In a slicing machine the combination of a knife; a rotary carrier upon which a piece to be sliced is placed and means controlled by the material being sliced for advancing the carrier upon the completion of the slicing of the piece.

3. In a slicing machine the combination of a rotary carrier on which a plurality of pieces to be sliced are placed; and means controlled by the material being sliced for advancing the carrier on completion of the slicing of one piece to bring a new piece into slicing position.

4. In a slicing machine the combination of a knife; a rotary carrier on which a piece to be sliced is placed, the carrier receiving the material in the upper part of its periphery and advancing it to a lower portion of its periphery and inverting it to be sliced; and means controlled by the material being sliced for advancing the carrier upon completion of the slicing of the piece.

5. In a slicing machine the combination of a knife; a rotary carrier on which a piece to be sliced is placed, the carrier receiving the material in the upper part of its periphery and advancing it to a lower portion of its periphery and inverting it to be sliced; means controlled by the material being sliced for advancing the carrier upon completion of the slicing of the piece; and means for holding the material on the carrier as the carrier is inverted.

6. In a slicing machine the combination of a knife; a carrier on which a piece to be sliced is placed; means controlled by the material being sliced for advancing the carrier on the completion of the slicing of the piece; a conveyer receiving the material and means for advancing said conveyer in relation to the slicing to deposit the material in rows.

7. In a slicing machine the combination of a knife; a series of carriers on each of which a piece to be sliced is placed, said carriers being adapted to deposit the material as sliced in rows; and means controlled by the material being sliced for advancing each carrier independently upon completion of the slicing of a piece on any carrier.

8. In a slicing machine the combination of a knife; a rotary carrier on which a piece to be sliced is placed, said carrier comprising a series of radial pins; followers slidingly mounted relative to said pins and adapted to follow the fruit as it is sliced; an oscillating driver for the carrier; and means carried by the followers and moved into the path of the driver on the completion of the slicing operation on the pin with relation to which the follower is mounted.

9. In a slicing machine the combination of a rotary carrier having a series of guides for material; followers resting on material held by the guide; a driver for the carrier; a knife; means for reciprocating the knife and actuating the driver; and devices on the followers moving into the path of the driver upon the completion of the slicing operation of the material guided with relation to the follower.

10. In a slicing machine the combination of a rotary carrier having a series of guides for material; followers resting on material held by the guides; a driver for the carrier comprising a reciprocating arm; a knife; means for reciprocating the knife and actuating the arm of the driver; devices on the followers moving into the path of the driver upon the completion of the slicing operation of the material guided with relation to the follower; and means for yieldingly holding the carrier in slicing position with each advance.

11. In a slicing machine the combination of a tray carrier; a slicer adapted to cut material and deposit the same on trays on the tray carrier; means for advancing the carrier; and devices controlled by a tray on the carrier controlling the means to prevent a deposit of material on the ends of the trays.

12. In a slicing machine the combination of a tray carrier; a slicer adapted to cut material and deposit the same on trays on the tray carrier; a ratchet mechanism having a reciprocating pawl for advancing the tray carrier; and a pawl carrier controlling the travel of the pawl in position to advance the tray carrier.

13. In a slicing machine the combination of a tray carrier; a slicer adapted to cut material and deposit the same on trays on the tray carrier; a ratchet mechanism having a reciprocating pawl for advancing the tray carrier; a pawl carrier controlling the travel of the pawl in position to advance the tray carrier; and means for adjusting the pawl carrier to vary the travel of the tray carrier.

14. In a slicing machine the combination of a tray carrier; a slicer adapted to cut material and deposit the same on trays on the tray carrier; a ratchet mechanism having a reciprocating pawl for advancing the tray carrier; a pawl carrier controlling the travel of the pawl in position to advance the tray carrier; and means controlled by the tray on the carrier for actuating the pawl carrier to vary the advance of the tray carrier to prevent the deposit of material on the ends of the trays.

15. In a slicing machine the combination of a tray carrier; a pulley forming a support for the carrier; a slicer adapted to cut material and deposit the same on trays on the tray carrier; a ratchet wheel locked with said pulley; a rock arm carrying a pawl and adapted to operate on said ratchet wheel; a reciprocating mechanism for actuating the slicer; a rock arm; a pawl carrier adapted to limit the action of the pawl on the ratchet wheel; and a cam in the path of the ends of the trays for actuating the pawl carrier to control the travel of the tray carrier to prevent the deposit of material on the ends of the trays.

In testimony whereof I have hereunto set my hand.

HERBERT G. MILLER.

Copies of this patent may be obtained for five cents each, by addressing the "Commissioner of Patents, Washington, D. C."

It is hereby certified that Letters Patent No. 1,270,041, granted June 18, 1918, upon the application of Herbert G. Miller, of The Dalles, Oregon, for an improvement in "Slicing-Machines," were erroneously issued to Pacific Evaporator Company as sole owner of said invention, whereas said Letters Patent should have been issued to the *inventor, said Miller, and Pacific Evaporator Company, jointly,* said corporation being assignee of *one-half interest* only, as shown by the records of assignments in this office; and that the said Letters Patent should by read with this correction therein that the same may conform to the record of the case in the Patent Office.

Signed and sealed this 30th day of July, A. D., 1918.

[SEAL.]

Cl. 146—11.

R. F. WHITEHEAD,

*Acting Commissioner of Patents.*